United States Patent
Gaskins

(10) Patent No.: US 6,694,946 B1
(45) Date of Patent: Feb. 24, 2004

(54) METHOD OF DEACTIVATING SELECTED FUEL INJECTORS OF AN INTERNAL COMBUSTION ENGINE FOR IMPROVED IDLE STABILITY

(75) Inventor: Ronald E. Gaskins, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/374,356

(22) Filed: Feb. 25, 2003

(51) Int. Cl.[7] .................................................. F02D 3/02
(52) U.S. Cl. .............................. 123/339.11; 123/339.14; 123/481
(58) Field of Search ....................... 123/339.11, 339.14, 123/481

(56) References Cited

U.S. PATENT DOCUMENTS

| | | | | |
|---|---|---|---|---|
| 4,991,558 A | * | 2/1991 | Daly et al. ................... | 123/481 |
| 5,374,224 A | * | 12/1994 | Huffmaster et al. ...... | 123/198 F |
| 5,481,461 A | * | 1/1996 | Miyamoto et al. .......... | 123/481 |
| 5,579,736 A | * | 12/1996 | Nakamura et al. ..... | 123/339.11 |
| 5,720,257 A | * | 2/1998 | Motose et al. ......... | 123/339.14 |
| 6,470,852 B1 | * | 10/2002 | Kanno ................... | 123/339.11 |

* cited by examiner

Primary Examiner—Erick Solis
(74) Attorney, Agent, or Firm—Jimmy L. Funke; Stefan V. Chmielewski

(57) ABSTRACT

An idle stability control for a fuel injected internal combustion engine deactivates selected fuel injectors after specified idle conditions have been met for a predetermined period of time, and thereafter until the conditions are no longer met. The engine spark timing is temporarily modified on each transition to and from the control to reduce operator perception of the injector deactivation and reactivation. Additionally, the injector deactivation pattern is periodically adjusted following an overlap period during which all of the injectors are enabled.

7 Claims, 6 Drawing Sheets

METHOD OF DEACTIVATING SELECTED FUEL INJECTORS OF AN INTERNAL COMBUSTION ENGINE FOR IMPROVED IDLE STABILITY

TECHNICAL FIELD

The present invention relates to the control of a fuel injected internal combustion engine, and more particularly to a method of deactivating selected fuel injectors of the engine for the purpose of improving engine idle stability.

BACKGROUND OF THE INVENTION

High performance internal combustion engines frequently exhibit stability problems when operating at or near idle speeds with little or no load. Traditional methods of improving stability under such conditions include controlling the intake airflow or spark timing. A potentially more attractive method of improving stability involves selective deactivation of certain fuel injectors during idle. This method improves stability by effectively increasing the load on the remaining engine cylinders, and offers the additional advantages of reducing fuel consumption and exhaust gas emissions. However, deactivating fuel injectors tends to be difficult to implement in a way that is not perceived by the vehicle occupants. Accordingly, what is needed is an improved method of carrying out a fuel injector deactivation idle stability control.

SUMMARY OF THE INVENTION

The present invention is directed to an improved idle stability control for a fuel injected internal combustion engine, wherein selected fuel injectors are deactivated after specified idle conditions have been met for a predetermined period of time, and thereafter until the conditions are no longer met, and wherein the engine spark timing is temporarily modified on each transition to and from the control to reduce operator perception of the injector deactivation and reactivation. Additionally, the injector deactivation pattern is periodically adjusted following an overlap period during which all of the injectors are enabled.

BRIEF DESCRIPTION OF THE DRAWINGS

FIG. 2 is a main or executive flow diagram;

FIG. 3 details a portion of the flow diagram of FIG. 2 pertaining to conditions for entering and exiting the idle stability control of this invention;

FIG. 4 details a portion of the flow diagram of FIG. 2 pertaining to phasing out an engine spark timing modification initiated when the idle stability control of this invention transitions from off to on; and FIG. 5 details a portion of the flow diagram of FIG. 2 pertaining to phasing out an engine spark timing modification initiated when the idle stability control of this invention transitions from on to off.

DESCRIPTION OF THE PREFERRED EMBODIMENT

Figure 1:
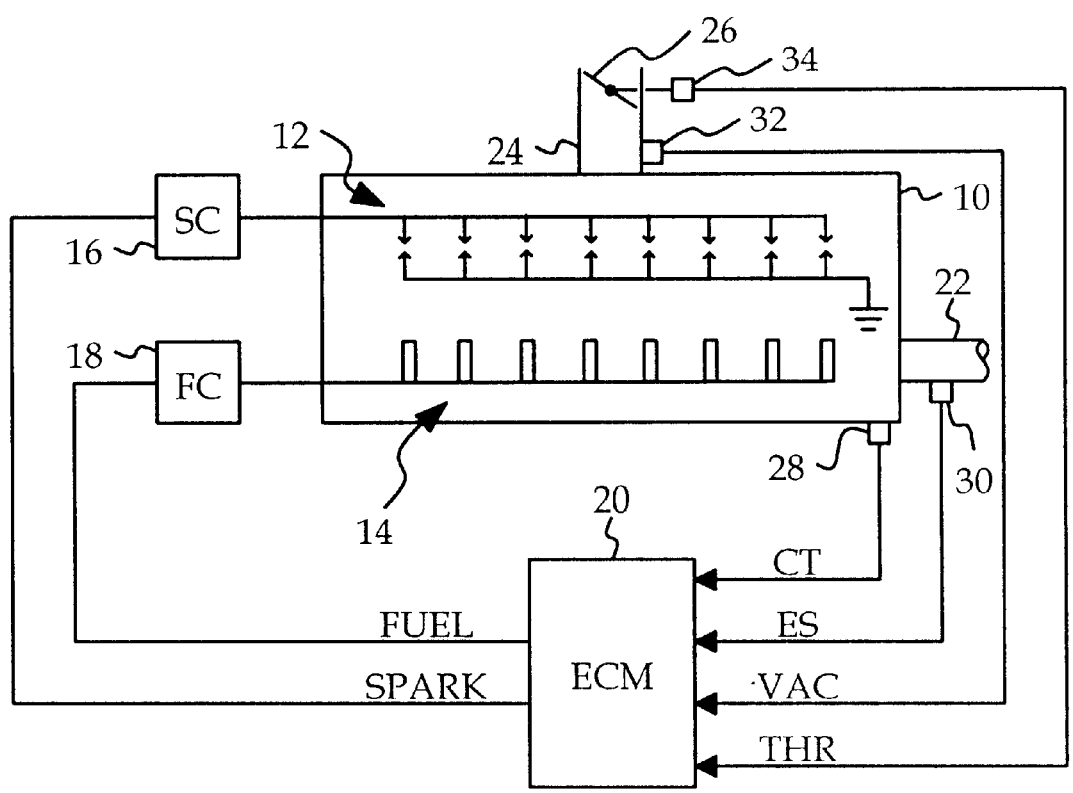
FIG. 1 is a diagram of a vehicle power plant including a fuel injected internal combustion engine and a microprocessor-based engine control module (ECM) for regulating engine fuel and spark controls.

Referring to the drawings, and more particularly to FIG. 1, the reference numeral 10 designates a multi-cylinder spark-ignition internal combustion engine controlled according to this invention. In the illustrated embodiment, the engine 10 has eight cylinders, each of which is equipped with a spark plug (generally designated by the reference numeral 12) and a fuel injector (generally designated by the reference numeral 14). The spark plugs 12 are individually controlled by a conventional spark control (SC) mechanism 16, and the fuel injectors 14 are individually controlled by a conventional fuel control (FC) mechanism 18, both of which are operated under the control of a conventional microprocessor-based electronic control module (ECM) 20 as indicated. The ECM 20 carries out a number of conventional engine control and diagnostic algorithms, and according to this invention, additionally carries out an idle stability control based on selective deactivation of the fuel injectors 14. To this end, ECM 20 receives a number of engine-related inputs, including an engine coolant temperature signal CT, an engine speed signal ES based on the rotational speed of output shaft 22, a vacuum signal VAC based on the air pressure in intake manifold 24, and a throttle signal THR based on the rotary position of engine throttle valve 26. The CT, ES, VAC and THR signals are measured with conventional sensors 28, 30, 32 and 34 as shown.

Figure 4:
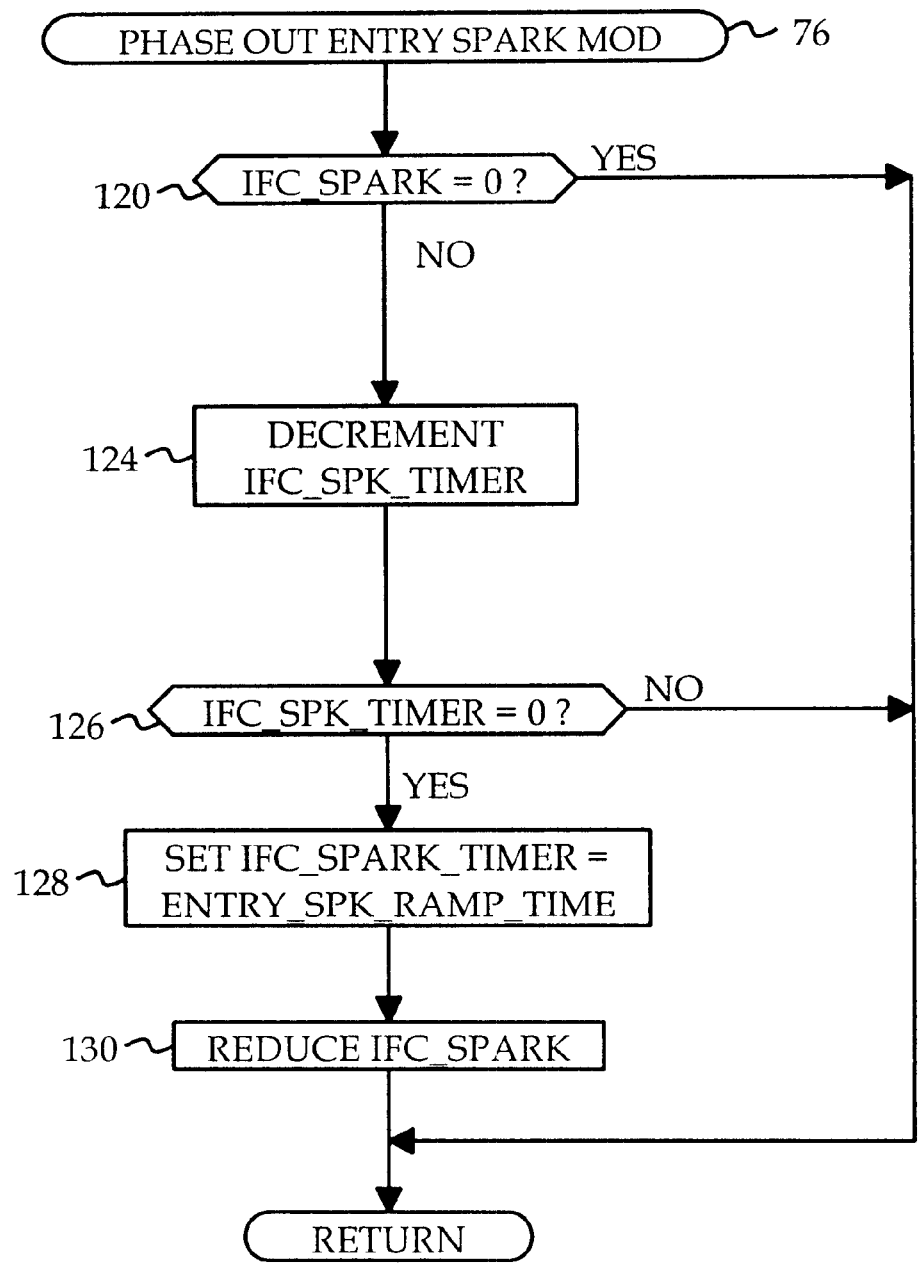
Figure 5:
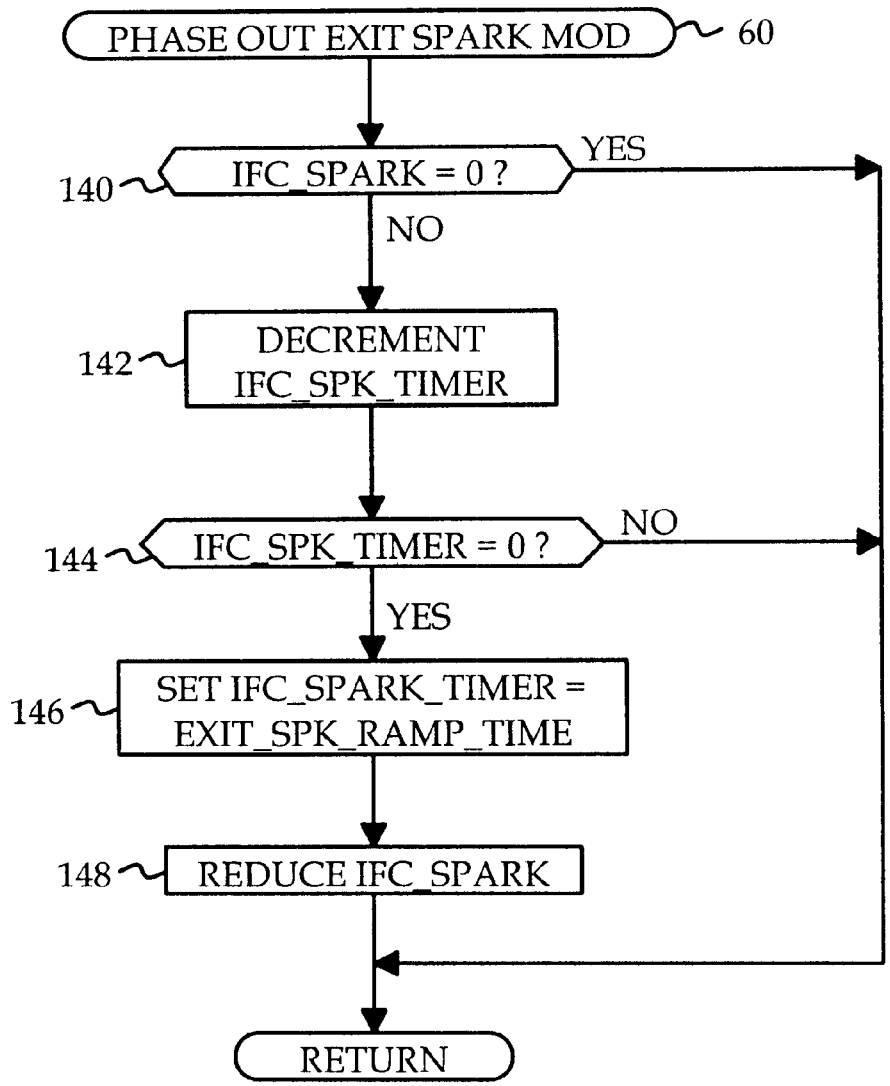
Figure 6:
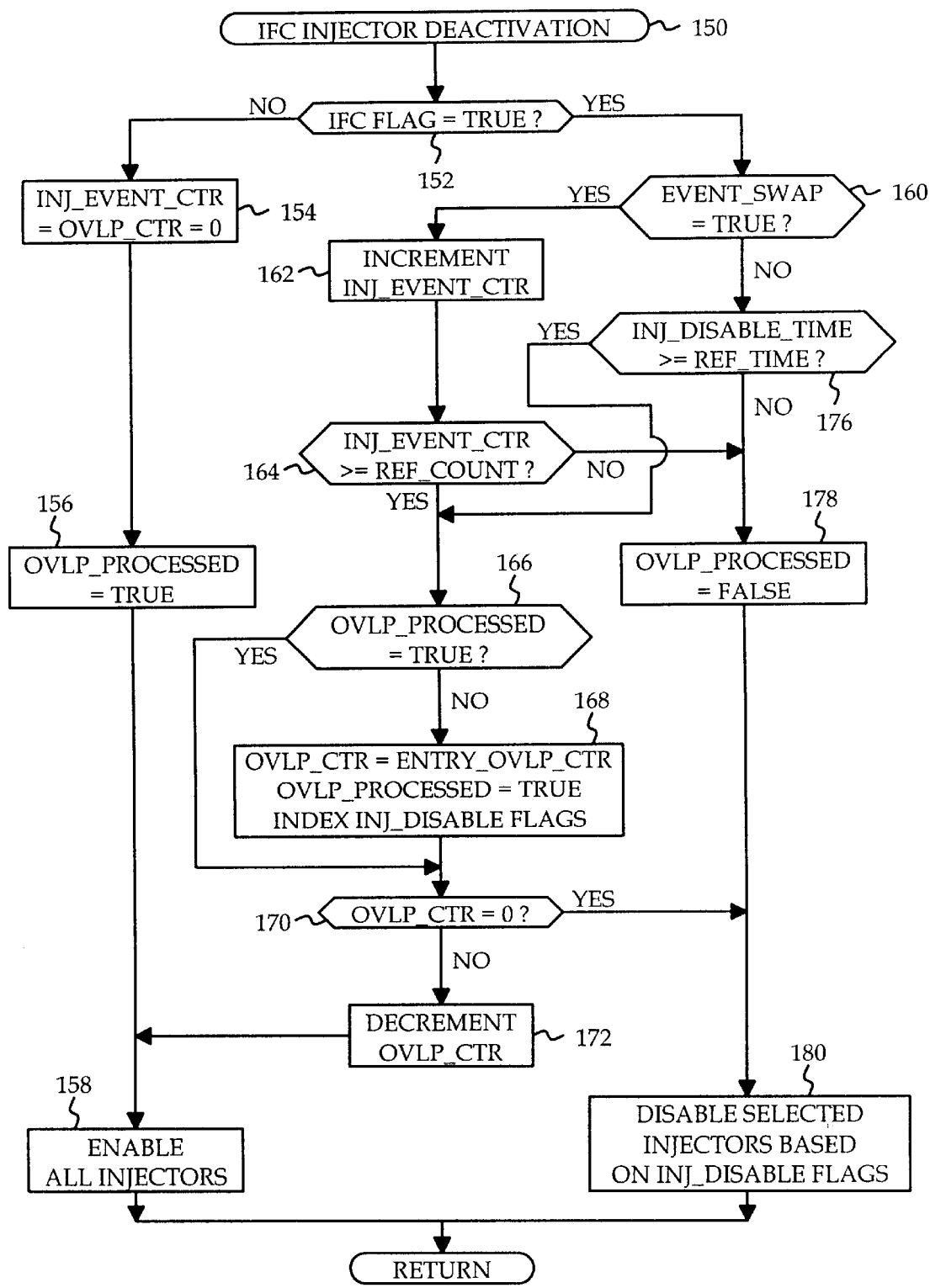
FIG. 6 is a flow diagram of an event-driven software routine executed by the ECM of FIG. 1 for establishing a pattern of fuel injector deactivation during operation of the idle stability control of this invention.

The idle stability control carried out by ECM 20 is represented by the flow diagrams of FIGS. 2–6. FIGS. 2–5 represent a periodically executed software routine 50 for activating the control when specified enable conditions have been met and deactivating the control when the enable conditions are no longer met, whereas FIG. 6 represents an event-driven software routine 150 for establishing a pattern of fuel injector deactivation while the idle stability control is activated.

Figure 2:
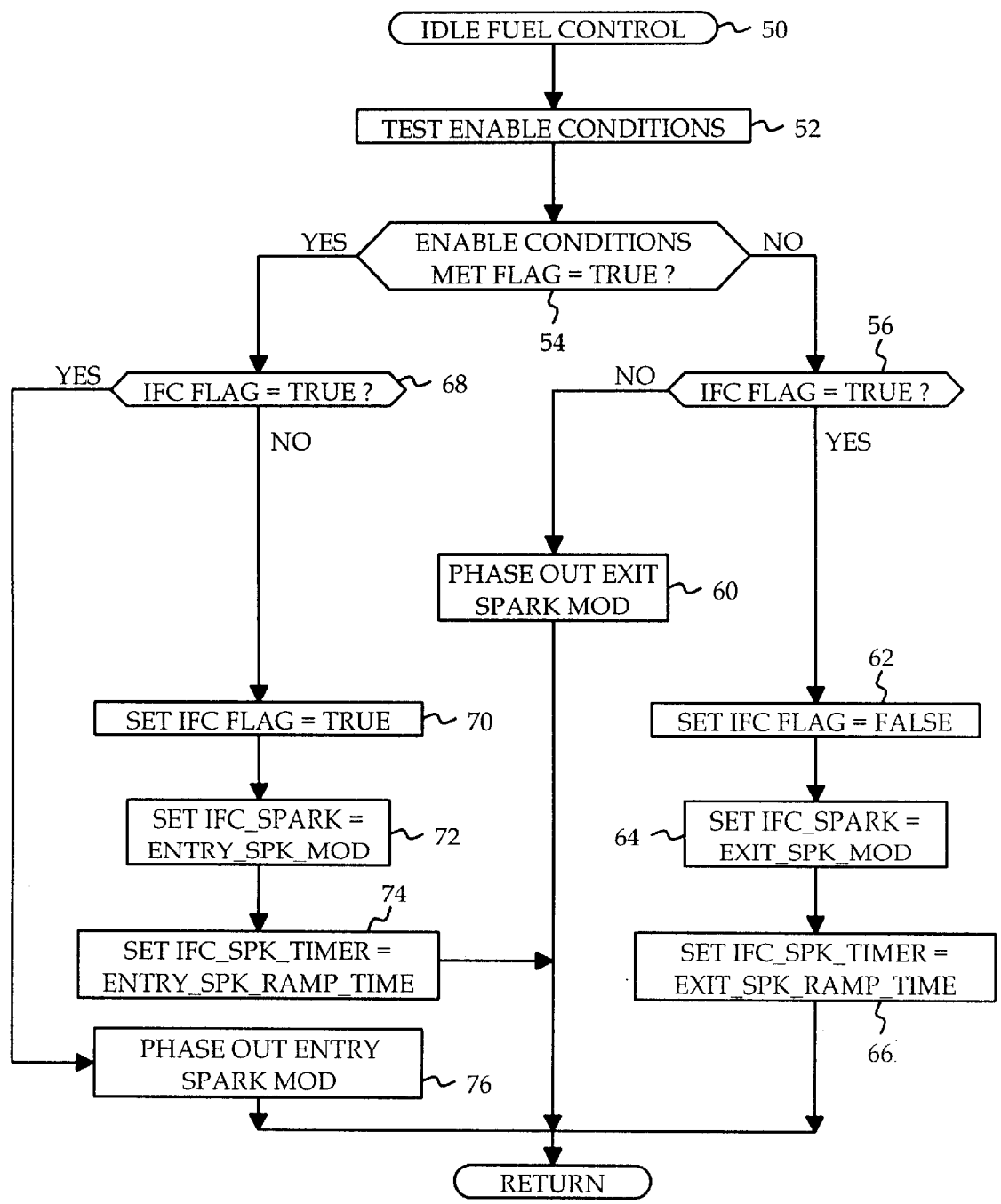
FIGS. 2–5 are flow diagrams of a software routine periodically executed by the ECM of FIG. 1 for carrying out the idle stability control of this invention.

Referring to FIGS. 2–5, the idle fuel control routine 50 involves periodically testing a number of enable conditions (as indicated at block 52), and initializing and updating spark timing modifications for conditioning the engine 10 for fuel injector deactivation or re-activation. Essentially, the spark timing is temporarily advanced on entering the control, and temporarily retarded on exiting the control. The idle fuel control enable conditions referenced by block 52 of FIG. 2 are detailed by the flow diagram of FIG. 3, the phasing out of the entry spark timing modifications designated by block 76 of FIG. 2 are detailed in the flow diagram of FIG. 4, and the phasing out of the exit spark timing modifications designated by the block 60 of FIG. 2 are detailed by the flow diagram of FIG. 5.

Figure 3:
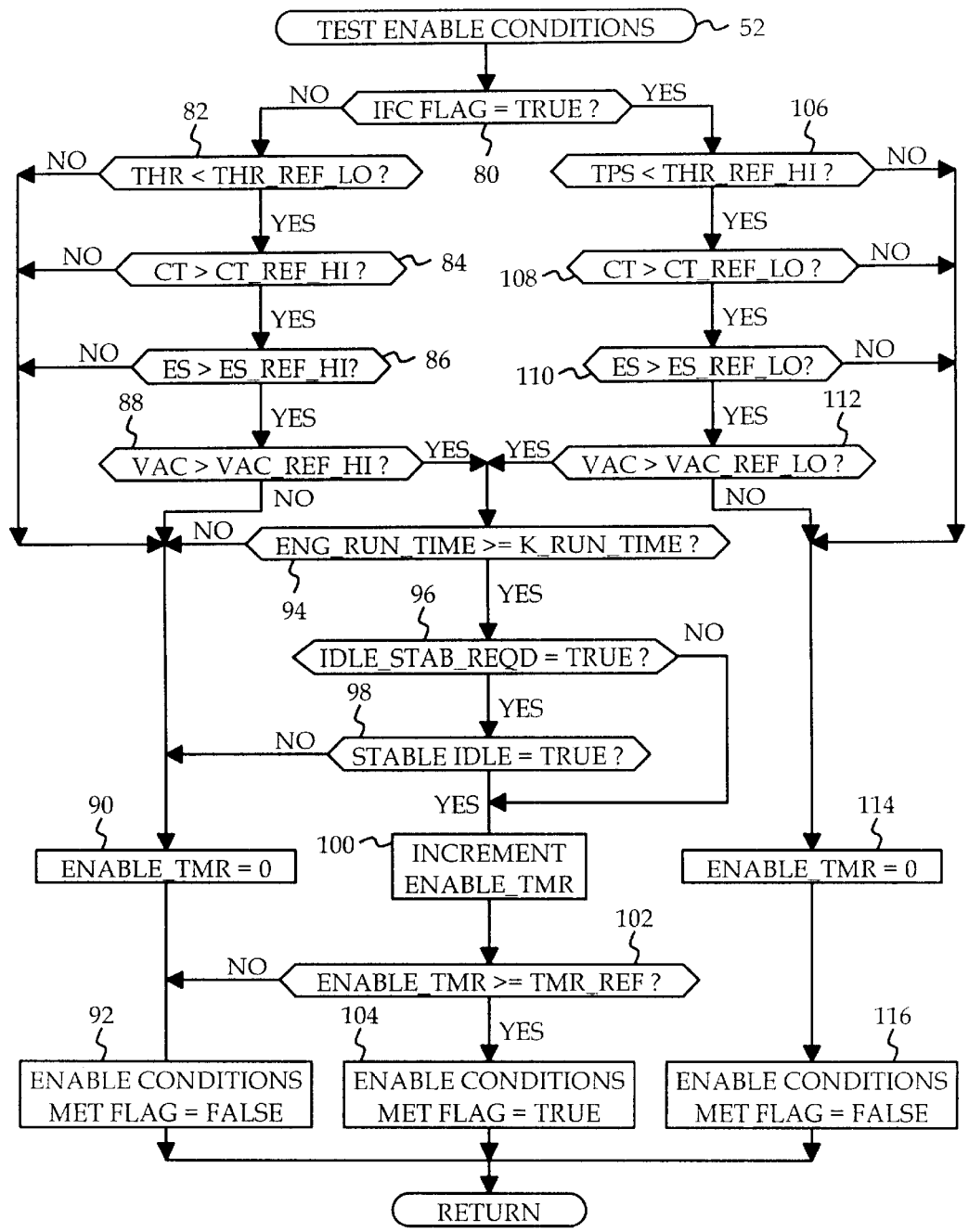

Referring to FIG. 3, the Test Enable Conditions function 52 involves comparing the input signals CT, ES, VAC and THR with various calibrated reference signals and controlling an enable timer (ENABLE_TMR) based on such comparisons. An additional and optional enable condition defined by block 98 and enabled by block 96 is that a stable engine idle has already been achieved. The blocks 90 or 114 reset ENABLE_TMR when the enable conditions are not met, while the block 100 increments ENABLE_TMR when the enable conditions are met. When block 102 determines that ENABLE_TMR has exceeded a calibrated reference TMR_REF, the block 104 sets the ENABLE_CONDITIONS_MET flag to True; otherwise, the blocks 92 or 116 set the ENABLE_CONDITIONS_MET flag to False.

Each time the enable conditions are tested, the block 80 is executed to determine if the idle fuel control is already active, as indicated by the status of the IFC Flag. Initially, the IFC Flag will be set to False, and the blocks 80, 82, 84, 86, 88, 94 and optionally 98 are executed to determine if: (1) THR is below a lower throttle reference (THR_REF_LO) such as 5%, (2) CT is above an upper temperature reference (CT_REF_HI) such as 140° F., (3) ES is above an upper speed reference (ES_REF_HI) such as 600 RPM, (4) VAC is above an upper pressure reference (VAC_REF_HI) such as 30 Barr, (5) the engine run time (ENG_RUN_TIME) exceeds a calibrated run time (K_RUN_TIME) such as 20 seconds, and optionally (6) the ECM 20 has stabilized the engine idle speed. If any of the conditions are not met, the blocks 90 and 92 are executed to reset ENABLE_TMR to zero and to set the ENABLE_CONDITIONS_MET flag to False. If the enable conditions defined by blocks 82, 84, 86, 88, 94 and optionally 98 are met, the block 100 is executed to increment ENABLE_TMR.

Once the idle fuel control 50 has been activated, the block 80 will be answered in the affirmative, and the blocks 106, 108, 110, 112, 94 and optionally 98 are executed to determine if: (1) THR is below an upper throttle reference (THR_REF_HI) such as 7%, (2) CT is above a lower temperature reference (CT_REF_LO) such as 130° F., (3) ES is above a lower speed reference (ES_REF_LO) such as 450 RPM, (4) VAC is above a lower pressure reference (VAC_REF_LO) such as 20 Barr, (5) the engine run time (ENG_RUN_TIME) exceeds K_RUN_TIME, and optionally (6) the ECM 20 has stabilized the engine idle speed. If any of the conditions defined by the blocks 106, 108, 110, 112, 94 and optionally 98 are not met, the blocks 114 and 116 are executed to reset ENABLE_TMR to zero and to set the ENABLE_CONDITIONS_MET flag to False. If the enable conditions defined by the blocks 106, 108, 110, 112, 94 and optionally 98 are met, then block 100 is executed to increment ENABLE_TMR.

Referring again to the flow diagram of FIG. 2, the Idle Fuel Control 50 checks the status of the ENABLE_CONDITIONS_MET flag at block 54. An additional flag—the IFC flag—indicates whether the idle fuel control is active, and blocks 56 or 68 check the status of the IFC flag. If both flags are False, the block 60 is executed to phase out any remaining exit spark modification from a prior activation of the idle fuel control. Once the enable conditions of FIG. 3 have been met and the ENABLE_CONDITIONS_MET flag is set to True, the block 54 will be answered in the affirmative, and block 68 checks the status of the EFC flag. Initially, the IFC flag will be False (indicating that the idle fuel control is not activated), and the blocks 70, 72 and 74 initialize the entry spark modification by setting the IFC flag to True, setting IFC_SPARK to a calibrated amount (ENTRY_SPK_MOD) such as 15 degrees of spark timing advance, and initializing a spark control timer (IFC_SPK_TIMER) to a calibrated value (ENTRY_SPK_RAMP_TIME) such as 0.8 seconds. In a subsequent execution of the routine, block 68 will be answered in the affirmative, and block 76 will be executed to phase out the entry idle spark modification as detailed in the flow diagram of FIG. 4.

Referring to FIG. 4, the block 120 will initially be answered in the negative (due to the prior execution of block 72), and block 124 will be executed to decrement the IFC_SPK_TIMER. When successive decrementing of IFC_SPK_TIMER reduces its value to zero (as determined by block 126), the block 128 resets IFC_SPK_TIMER to the entry value (ENTRY_SPK_RAMP_TIME), and block 130 reduces the spark timing modification parameter (IFC_SPARK) by a calibrated amount. When LFC_SPARK has been reduced to zero, the block 120 will be answered in the affirmative, and the execution of blocks 124–130 will be skipped as shown. In this way, the entry spark timing modification (ENTRY_SPK_MOD) is progressively removed following activation of the idle fuel control.

Referring again to FIG. 2, a True-to-False transition of the ENABLE_CONDITIONS_MET flag will result in the execution of blocks 62, 64 and 66. This sets the IFC flag to False, initializes IFC_SPARK to a calibrated exit value (EXIT_SPK_MOD) such as 10 degrees of spark timing retard, and sets IFC_SPK_RAMP_TIME to a calibrated time such as 0.4 seconds. In a subsequent execution of the routine, the blocks 56 and 58 will be answered in the negative, and the block 60 will be executed to phase out the exit idle spark modification as detailed in the flow diagram of FIG. 5.

Referring to FIG. 5, the block 140 will initially be answered in the negative (due to the prior execution of block 64), and block 142 will be executed to decrement the IFC_SPK_TIMER. When successive decrementing of IFC_SPK_TIMER reduces its value to zero (as determined by block 144), the block 146 resets IFC_SPK_TIMER to the exit value (EXIT_SPK_RAMP_TIME), and block 148 reduces the spark timing modification parameter (IFC_SPARK) by a calibrated amount. When IFC_SPARK has been reduced to zero, the block 140 will be answered in the affirmative, and the execution of blocks 142–148 will be skipped as shown. In this way, the exit spark timing modification (EXIT_SPK_MOD) is progressively removed following deactivation of the idle fuel control.

The idle fuel injector control 150 depicted by the flow diagram of FIG. 6 is executed in synchronism with engine rotation for selectively deactivating one or more fuel injectors 14 so long as the IFC flag is True. Thus, if the block 152 determines that the IFC flag is False, the blocks 154, 156 and 158 are executed to reset a number of injector control parameters and to enable activation of all fuel injectors 14. The injector control parameters, including an injection event counter (INJ_EVENT_CTR), an overlap counter (OVLP_CTR), and an overlap processed (OVLP_PROCESSED) flag, are used to periodically index the deactivated injector(s) so that no given injector 14 is deactivated for a prolonged time.

The flow diagram of FIG. 6 accommodates two different strategies for determining when to index the injector deactivation pattern. A first strategy, enabled when the EVENT_SWAP flag is True, indexes the deactivation pattern when a calibrated number (REF_COUNT) of injection events has occurred. In this case, the block 160 is answered in the affirmative, and the block 162 increments INJ_EVENT_CTR. So long as INJ_EVENT_CTR is less than REF_COUNT, the blocks 178 and 180 set the OVLP_PROCESSED flag to False, and disable fuel injectors based on the current deactivation pattern. When INJ_EVENT_CTR reaches REF_COUNT, the block 176 is answered in the affirmative, the blocks 166–172 are executed to index the injector deactivation pattern.

The second strategy, enabled when the EVENT_SWAP flag is False, indexes the deactivation pattern when the time of injector deactivation (INJ_DISABLE_TIME) reaches a calibrated time (REF_TIME). So long as INJ_DISABLE_TIME is less than REF_TIME, the blocks 178 and 180 set the OVLP_PROCESSED flag to False, and disable fuel injectors based on the current deactivation pattern. When INJ_DISABLED_TIME reaches REF_TIME, the block 176 is answered in the affirmative, the blocks 166–172 are executed to index the injector deactivation pattern.

Indexing the injector deactivation pattern involves activating all of the injectors for a calibrated number (ENTRY_OVLP_CTR) of injection events such as four events, and then disabling selected injectors based on a modified pattern. When either block 164 or 176 are answered in the affirmative, the block 166 is executed to determine if the OVLP_PROCESSED flag is True. Initially, it will be False due to the prior execution of block 178, and the block 168 is executed to reset OVLP_CTR to ENTRY_OVLP_CTR, to set the OVLP_PROCESSED flag to True, and to index a set of flags (INJ_DISABLE Flags) used to define the injector disable pattern. In one possible implementation, for example, the injectors for cylinders 1 and 4 of the eight-cylinder engine 10 would be initially flagged for deactivation during idle fuel control, whereafter the pattern would be indexed to flag deactivation of the fuel injectors for cylinders 3 and 5. In subsequent executions of the routine, the block 166 will be answered in the affirmative, and the block 168 is skipped as shown. However, the new injector pattern is not put into effect until OVLP_CTR has been decremented to zero, as determine by block 170. So long as OVLP_CTR is greater than zero, the blocks 172 and 158 are executed to decrement OVLP_CTR and to enable activation of all injectors. When OVLP_CTR reaches zero, the block 180 is executed to implement the indexed injector deactivation pattern. If desired, spark timing modifications may also be temporarily induced on transitions to and from the injector overlap interval.

In summary, the idle fuel control of the present invention provides an improved idle stability control in which selected fuel injectors are deactivated after specified idle conditions have been met for a predetermined period of time, and thereafter until the conditions are no longer met, and in which the engine spark timing is temporarily modified on each transition to and from the control to reduce operator perception of the injector deactivation and reactivation. Additionally, the injector deactivation pattern is periodically adjusted following an overlap period during which all of the injectors are enabled. While such control has been described in reference to the illustrated embodiment, it is anticipated that various modifications in addition to those mentioned above will occur to those skilled in the art. For example, the spark modification phase out may be eliminated by calibration such that the spark timing is advanced upon injector deactivation, and then returned to the normal value upon injector reactivation. In this regard, it should be understood that control methods including these and other modifications may fall within the scope of this invention, which is defined by the appended claims.

What is claimed is:

1. A method of operation for a spark ignition fuel injected internal combustion engine including one or more fuel injectors that are disabled during an engine idle condition to improve idle stability, the method comprising the steps of:

monitoring engine operating parameters to detect an engine idle condition;

when the engine idle condition has been continuously detected for at least a predetermined time period, activating an idle stability control by advancing a timing of the spark ignition, disabling further activation of at least a first fuel injector, and thereafter progressively removing the advancing of the spark ignition timing; and when the engine idle condition is no longer detected, deactivating the idle stability control by retarding the timing of the spark ignition, re-enabling activation of said first fuel injector, and thereafter progressively removing the retarding of the spark ignition timing.

2. The method of operation of claim 1, wherein the step of monitoring engine operating parameters includes the step of:

detecting the engine idle condition when a speed of the engine is above a speed threshold, a throttle of said engine is below a position threshold, a temperature of said engine is above a temperature threshold, a manifold vacuum of said engine is above a pressure threshold, and a run time of said engine exceeds a time threshold.

3. The method of operation of claim 1, wherein the step of monitoring engine operating parameters includes the step of:

detecting the engine idle condition when a speed of the engine is above a speed threshold, a throttle of said engine is below a position threshold, a temperature of said engine is above a temperature threshold, a manifold vacuum of said engine is above a ressure threshold, a run time of said engine exceeds a time threshold, and an idle speed of said engine has been stabilized.

4. The method of operation of claim 1, wherein the step of activating said idle stability control includes the step of:

periodically re-enabling activation of said first fuel injector for a predetermined time period, and thereafter disabling further activation of at least a second fuel injector which is different than said first fuel injector.

5. The method of operation of claim 1, wherein the step of activating said idle stability control includes the step of:

counting injection events of said engine, and when said counted injection events reach a predetermined count, re-enabling activation of said first fuel injector for a predetermined number of injection events, and thereafter disabling further activation of at least a second fuel injector which is different than said first fuel injector.

6. The method of operation of claim 1, wherein the step of activating said idle stability control includes the step of:

measuring an elapsed time, and when said elapsed time reach a predetermined time, re-enabling activation of said first fuel injector for a predetermined number of injection events, and thereafter disabling further activation of at least a second fuel injector which is different than said first fuel injector.

7. The method of operation of claim 1, wherein the step of activating said idle stability control includes the step of:

disabling further activation of at least a second fuel injector which is different than said first fuel injector following an overlap period during which all of the injectors are enabled.

* * * * *